United States Patent [19]

Gurak

[11] Patent Number: 4,482,421
[45] Date of Patent: Nov. 13, 1984

[54] ULTRASONIC FRICTION-FUSION METHOD AND APPARATUS

[75] Inventor: Ronald W. Gurak, Fox River Grove, Ill.

[73] Assignee: Signode Corporation, Glenview, Ill.

[21] Appl. No.: 384,221

[22] Filed: Jun. 2, 1982

[51] Int. Cl.³ .................. B29C 27/08; B65B 13/32
[52] U.S. Cl. .................. 156/580.1; 100/33 PB; 156/73.1; 156/73.5; 156/580; 228/1 R
[58] Field of Search .................. 156/73.1, 73.4, 73.5, 156/580, 580.1, 580.2; 100/29, 33 PB; 228/1 R

[56] References Cited

U.S. PATENT DOCUMENTS

| | | | |
|---|---|---|---|
| 3,054,309 | 9/1962 | Elmore et al. | 228/1 |
| 3,442,732 | 5/1969 | Stensaker et al. | 156/73.4 |
| 3,483,073 | 12/1969 | Pounder et al. | 156/73.1 |
| 3,548,740 | 12/1970 | Kobiella | 156/73.5 |
| 4,208,001 | 6/1980 | Martner | 156/73.1 |
| 4,244,773 | 1/1981 | Siebeck et al. | 156/580.1 |

Primary Examiner—Michael Wityshyn
Attorney, Agent, or Firm—Dressler, Goldsmith, Shore, Sutker & Milnamow, Ltd.

[57] ABSTRACT

Apparatus and method for securing a thermoplastic strap around a package by compressing the overlapping strap end portions together and moving one of the overlapping end portions in a transverse direction relative to the other at a very high frequency and small amplitude to melt and fuse the interface region therebetween. The transducer used to produce the ultrasonic vibrations is supported solely at its nodal point where it is vibration free.

4 Claims, 14 Drawing Figures

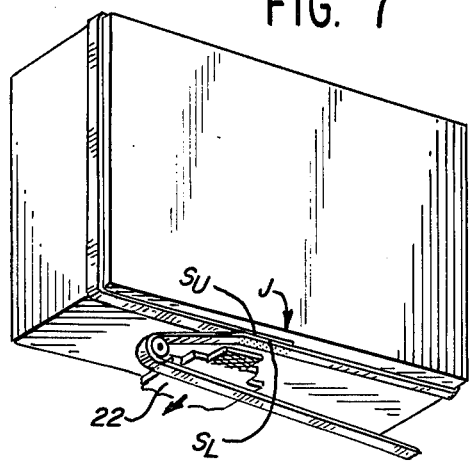
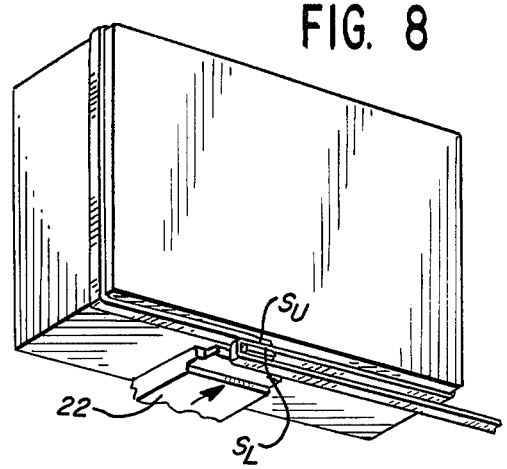
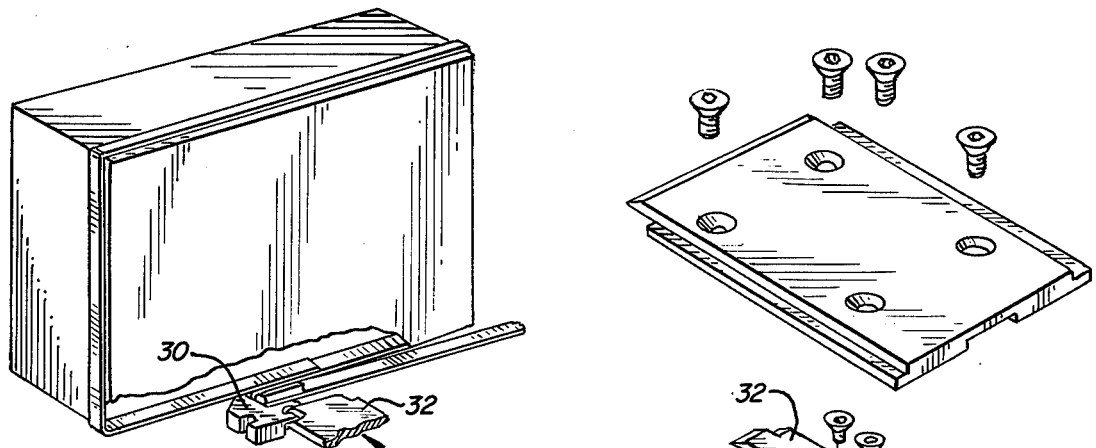
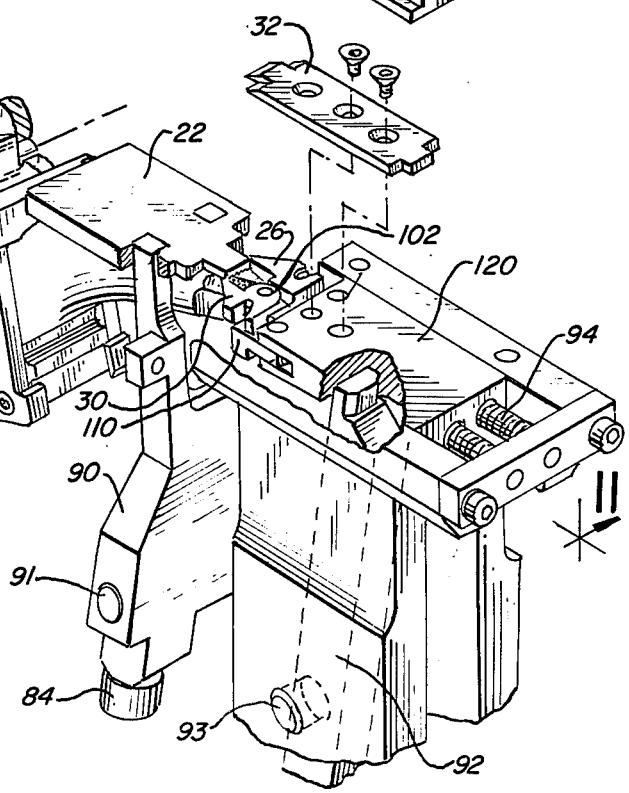

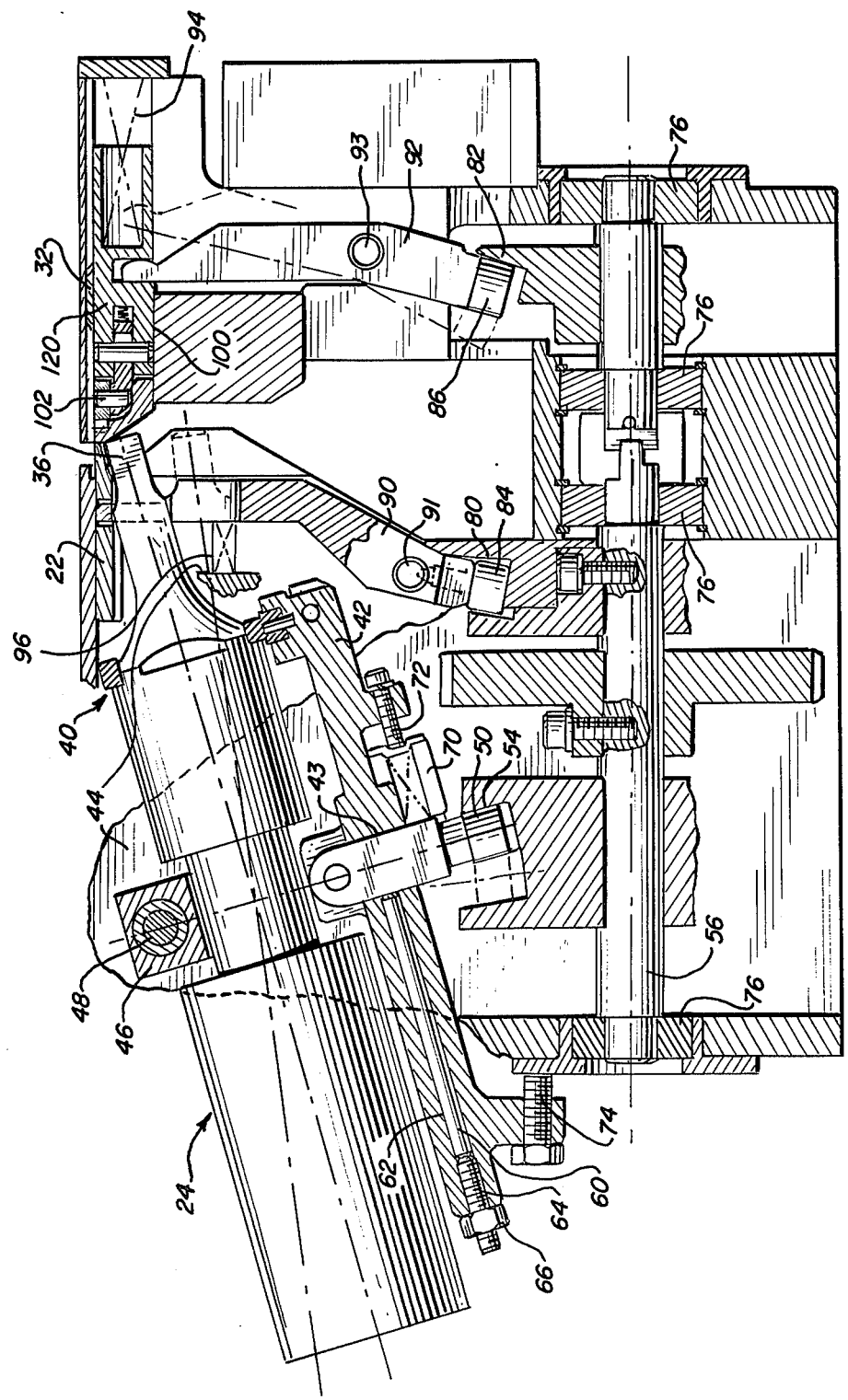

ULTRASONIC FRICTION-FUSION METHOD AND APPARATUS

TECHNICAL FIELD

This invention relates to a method and apparatus for friction welding overlapping strap portions maintained under pressure by using very high frequency to move overlapping strap portions in a transverse direction relative to each other.

BACKGROUND OF THE INVENTION

This invention relates to an apparatus and a method for friction-fusing overlapping portions of plastic strapping to form a joint therebetween by the utilization of very high frequency movement with low amplitude. Plastic strapping of the type that can be used are those formulated from thermoplastic resin materials such as longitudinally oriented linear polymer material such as polypropylene. The friction-fusion technique is currently being utilized in devices where the overlapping strap ends are held together under substantial pressure and then moved relative to each other to develop a bodily sliding frictional generation of heat at the interface region. In the existing devices, there is used a reciprocating method of movement in which the strap ends are moved in the longitudinal direction relative to each other.

SUMMARY OF THE INVENTION

The present invention relates to a novel and unique method of friction welding plastic strapping disposed under tension around a package by using a device moving at a very high frequency and low amplitude as the energy input device. It can be appreciated that if the fusion-function takes place over a very short period of time and there is a very small movement at the joint interface, very little of the strap orientation will be destroyed. To this end, obviously a much stronger joint can be formed, comparatively speaking, if this method is practiced. Also, the high-speed at which the joint is formed reduces the pressure required on the strap to cause bonding to occur.

According to the present invention, the advantages discussed above can be obtained by using an ultrasonic horn as the energy input device. In addition, since the utilization of an ultrasonic device provides a very high vibration at the tip, the joint can be formed with a very small amount of movement, and thus, the friction-fusion joint can be formed by moving the strap in the transverse direction relative to the overlapped strap end. In the illustrated embodiment, the friction welding is done with the side of the rectangular tip of an ultrasonic horn. To obtain maximum efficiency, the ultrasonic horn is mounted at its nodal point which is an area of no movement. This mounting system allows pressure to be applied to the side of the horn tip, thereby putting pressure on the horn tip which is in contact with the strap. The life of the ultrasonic horn is extended by machining the circular surface of the horn into a square allowing for indexing of the horn tip after one side of the horn tip wears out. In this way, the ultrasonic horn tip has four times its normal useful life.

Other features and advantages of the invention will be apparent from the following description and claims, and are illustrated in the accompanying drawings which show apparatus that embodies features of the present invention, and the principles thereof.

BRIEF DESCRIPTION OF THE DRAWINGS

FIG. 7 shows the friction welding head being removed from the fused joint and the joined strap located under the package;

FIG. 8 is a view similar to FIG. 1 showing the strapping reversed under the package;

FIG. 9 is similar to FIG. 8 showing the introduction of the cutter to sever the strap adjacent the formed joint;

FIG. 10 is a perspective view partially broken away showing details of the fusion head, anvil, gripper and other related mechanisms;

FIG. 11 is a view taken along line 11—11 of FIG. 10; and

DESCRIPTION OF THE PREFERRED EMBODIMENT

Figure 1:
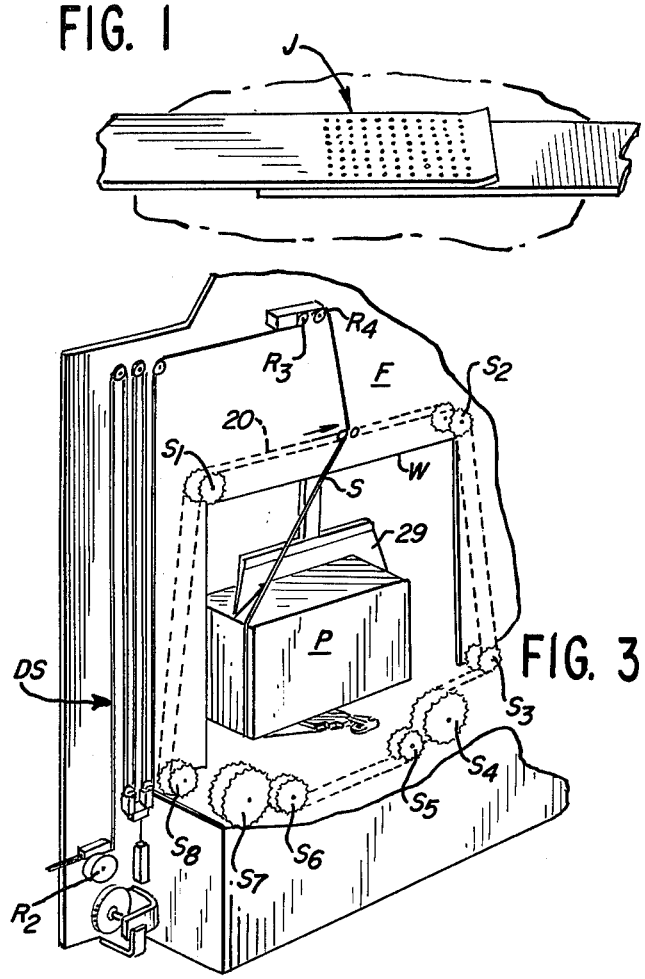
FIG. 1 is a view showing the joint formed by the ultra high speed friction fusion mechanism disclosed herein.

While the invention is susceptible of embodiment in many different forms, there are shown in the drawings and will herein be described in detail a preferred embodiment of the invention and modifications thereof, with the understanding that the present disclosure is to be considered as an exemplification of the principles of the invention and is not intended to limit the invention to the embodiment illustrated.

The scope of the invention will be pointed out in the appended claims.

Figure 2:
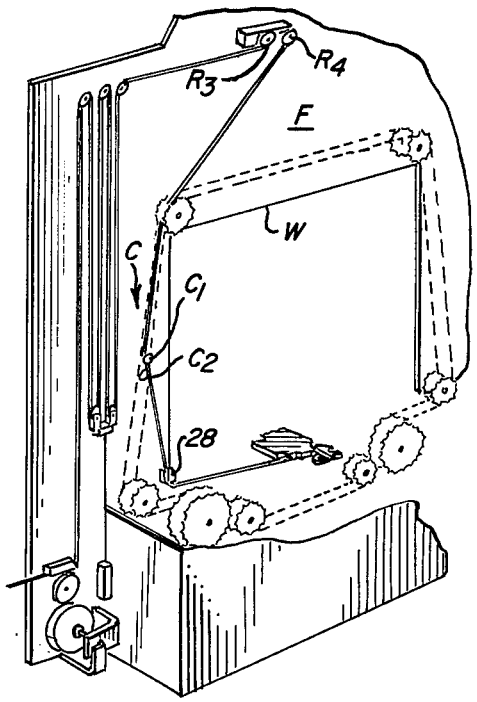
FIG. 2 is a diagrammatic view of the novel apparatus utilizing a chain driven carrier for pre-draping a loop of strap about a package.
Figure 3:
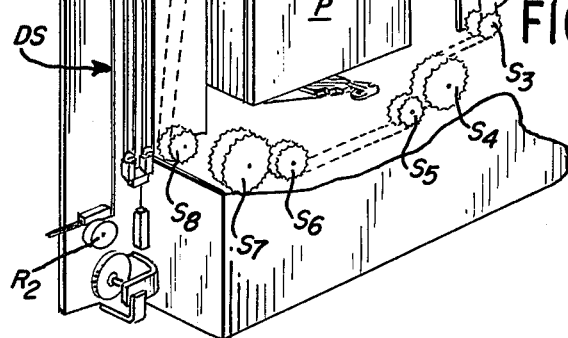
FIG. 3 is a view similar to FIG. 2 but showing the strap disposed about one side of the package.
Figure 4:
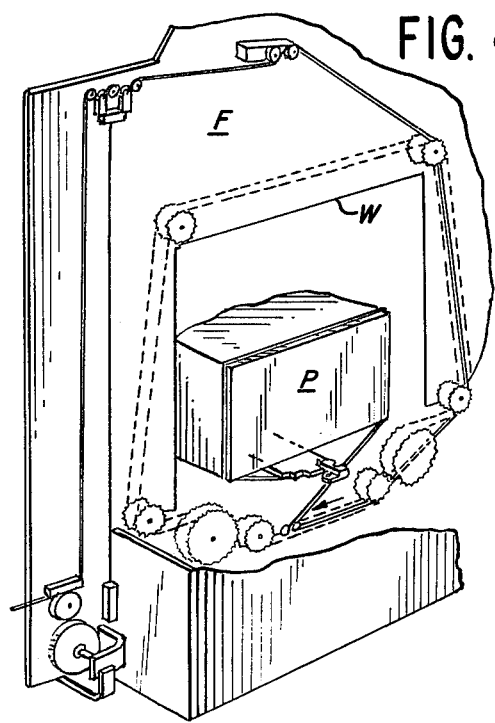
FIG. 4 is a view similar to FIG. 3 but showing the strapping disposed about the package but prior to being tensioned and fused.

Referring now to the drawings, the general arrangement and sequence of operation of the chain driven draping arrangement can best be traced with reference to FIGS. 2-9 with the understanding that the chain draping arrangement has been shown in FIGS. 2-4 for chain movement in the clockwise direction but that after the package located therein has been suitably strapped the chain carrier will be rotated in the counter clockwise direction to strap a subsequent package provided therein by suitable mechanisms or manually.

The apparatus includes main framing designated generally at F which provides a generally rectangular shaped window W for receiving a package P to be strapped. A support structure (not shown) underlies the bottom of the window and provides a guideway which receives the opposite ends of the strap loop that is being formed about the package. The main framing F mounts a set of sprocket rollers S1-S8 which have a chain 20 directed thereabout. The details of the pre-draping mechanism forms no part of the present invention and for further information regarding such details reference is made to U.S. Pat. No. 3,548,740 and U.S. Pat. No.

4,393,763 entitled "Method and Apparatus for Pre-Draping an Object Receiving Station With Flexible Binding" both of which are assigned to the assignee of the present invention. Briefly, there are upper corner sprocket rollers S1 and S2 outboard on each side of the window W and two sets of 3 vertically staggered sprocket rollers S3, S4, S5 and S6, S7, S8 adjacent and beneath each of the lower corners of the window.

Figure 13:
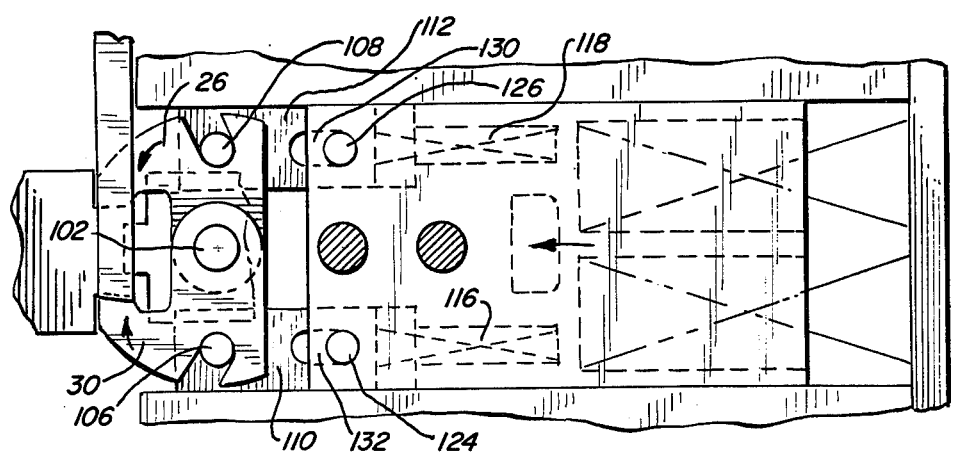
Figure 14:
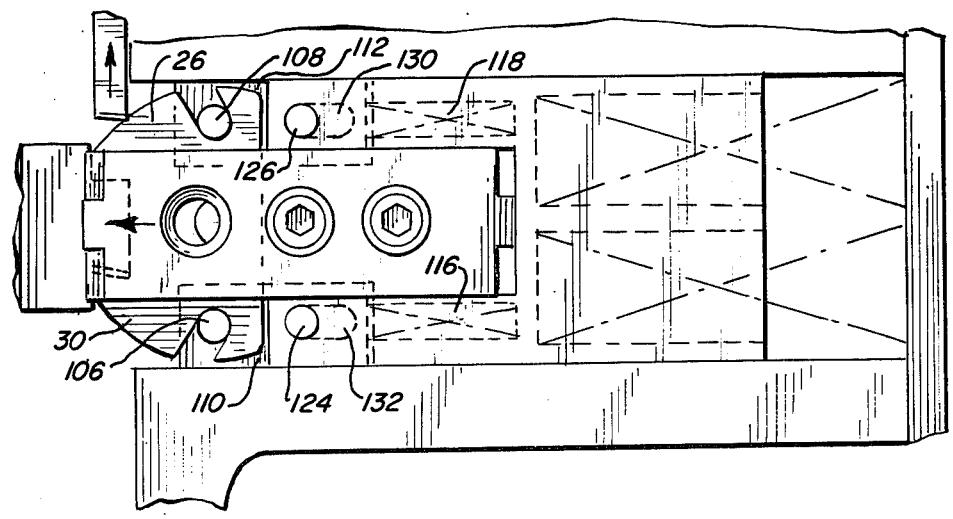

The roller chain strand 20 includes a strap carrier C at an intermediate segment thereof and includes spaced rollers C1 and C2 defining a pass region for the strap. The support structure includes an anvil 22 arranged to receive the free end of the strap S in underlying relation and a sealer 24 is shown positioned beneath the anvil 22 (FIG. 5) for movement into working position after an overlapping strap layer is formed beneath the free end upon completion of the strap draping and tensioning movement of the carrier. Gripper 26 is shown flanking the anvil 22 to engage the free end of the strap for holding strap tension while both grippers are operated at the same time, see FIGS. 12–14, only one is used to hold the strap against the anvil during the strapping of a package. During counterclockwise draping of the strap, the right-hand gripper is in engagement as illustrated in FIG. 9. The details of the sealer and the other novel mechanisms emloyed will be described hereinafter.

The strap supply arrangement illustrated herein includes an infeed roller (not shown) and an intermediate roller R2 which is operable to set and control the back tension acting upon the strap. The supply arrangement includes a dispensing and strap storing section DS capable of conveniently storing strap in preparation for draping about the package, for paying out the slack from storage to permit the back roller R2 to set the tension and for taking up slack which accumulates during the tension drawing operation of the main chain 20. The line of strap leading from the dispenser into the tension roller R2 and through the strap storing section DS and through a pair of centering rollers R3 and R4, midway across the top of the window allows for feeding of the strap in either wrapping direction about the package.

FIGS. 2, 3 and 4 sequentially illustrate the operation of the chain during a clockwise draping movement. At the beginning of the cycle as shown in FIG. 2 the free end of the strap S is fixedly held against the right side of the anvil by the right-hand gripper 26 and the layer of the strap underlies the anvil in contacting relation therewith and leads past the lower catch block 28, through the carrier C and around the upper left-hand sprocket S1 to the entry rollers R3 and R4 that overhang the center of the window. A common drive motor (not shown) directly powers the lower left-hand sprocket S8 for advancing the carrier chain 20 in a clockwise travel direction to move the carrier successively from the full line position around to the position shown in FIG. 4. The other sprockets or idlers guide the chain. In the position shown in FIG. 2, the strap is retained out of engagement with the package by the lower catch block 28 and as shown in FIG. 3, the lower catch block 28 has been removed to permit the strap to be pulled against the package. As shown in FIG. 3, the compression clamp 29 is moved downwardly to retain the package P in position during the strapping and tensioning action. Subsequently the carrier moves to the position shown in FIG. 4 where the strap is wrapped around the package during which time the strap is payed out from the dispensing strap storage section DS. Essentially all of the accumulated strap has been payed out from the storage section and any continued travel of the carrier requires direct payout of the strap from the supply real (not shown). Therefore, during the phase of the travel when the loop is being completed and the second overlapping strap layer is being formed beneath the anvil 22 and tension is drawn on the loop, the back tension roller R2 is operative to determine the value of the tension.

It may be noted that as the strap carrier C moves over the undulation in the carrier path created by sprocket S7, the line of strap S being wrapped across the bottom of the package P is moved to a location next to the gripped strap end. After the strap is above the sealer 24, the sealer 24 is shifted from the position shown in FIG. 5 toward the working position of FIG. 6 and when the sealer reaches the working position friction-fusion sealing of the overlapped strap ends by the novel method and apparatus to be described in detail hereinafter now occurs as the sealer 24 holds the strap under pressure against the anvil against the back tension while the carrier C is reversed.

Figure 6:
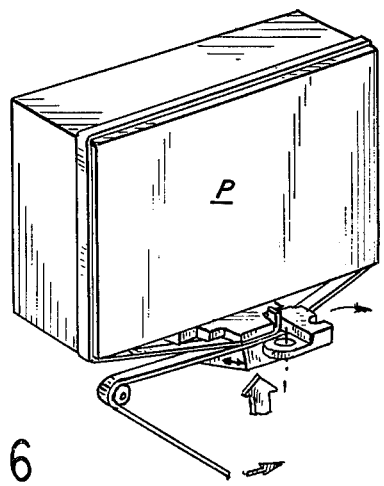
FIG. 6 shows the position of the fusion head during the friction welding operation.

When the reversal position of FIG. 6 is reached, suitable switch means (not shown) is actuated to reverse the drive motor and rotate sprocket S8 and chain 20 in a counterclockwise direction.

Following the sequence of steps, it should be noted that after fusion occurs, as shown in FIG. 7 the anvil 22 is shifted rearwardly so that the completed joint J snaps up against the underside of the package P, after which the anvil 22 returns to its projected position (FIG. 8) where it intercepts the plane of the strap loop but is located beneath the completed joint. As the carrier C moves in a counterclockwise direction the strap is snubbed about the left-hand side of the anvil (FIG. 9) and the left hand gripper 30 comes into play to hold the strap portion adjacent the fused joint against the left hand side of the anvil 22. At this time, a cutter 32 the operation of which to be described later severs the completed strap loop from the newly gripped strap and the device is now ready to drape a loop of strap in an opposite direction about a subsequent package.

After the strap loop has been severed, a counterclockwise motion of the carrier mechanism occurs after a subsequent package has been placed in the window and the strap is again wrapped about the package in the opposite direction with exactly the same machine functions taking place. For more complete description of a similar strap draping operation reference is made to U.S. Pat. No. 3,548,740 assigned to the assignee of the present invention.

In accordance with the present invention there is provided a novel method and apparatus for sealing the overlapped strap portions of a tensioned loop.

Essentially, the operational station for effecting the fused joint is centered above the lower reach of the main carrier chain 20 and includes the novel sealer 24 and grippers 26, 30 and cutter 32 spaced on opposite sides of the plane of the strap loop to define a guideway for reception of the strap.

Referring specifically to FIG. 11, there is illustrated the mechanism for providing a friction-fused joint. Essentially, the strap has been directed about the package and into position to be fused, as shown in FIG. 6. The mechanism used for applying pressure to the overlapped strap ends SU, SL and fuse them by moving one of the strap portions relative to the other in a transverse direction includes an ultrasonic transducer 24 which operates at very high frequency. The transducer is a commercially available unit supplied by Branson Sonic Power Co.

In the illustrated embodiment, the transducer operates in the vicinity of 20,000 cycles per second, and the movement of the tip 36 of the transducer is on the order of 0.007 inch. The transducer tip 36 is biased into contact with the strap, as shown in FIG. 11, with about 80 pounds pressure, and when operated moves the lower strap section SL transversely relative to the upper strap section SU to cause fusing at the interface between the adjacent strap portions. The tip 36 is generally rectangular in cross section whereby in the event of wearing of one of the surfaces, the transducer can be rotated 90° to permit utilization of another surface, etc. The mounting which permits this is to be later described. The transducer is used to ultrasonically move the tip 36 and not to impart ultrasonic waves through the horn.

To use the transducer for its intended function, it is essential that it be mounted at its nodal point since at this juncture there is zero movement. To accomplish this, as shown in FIGS. 10 and 11, transducer is flattened on four sides, at its nodal point and a bracket support frame assembly 40 encases the transducer in this area. The frame is then secured to a pivotally mounted platform 42. Since the frame is the sole support for the transducer and since the transducer is supported at its nodal point, there is no movement transferred to the platform. The platform is pivotally mounted relative to a main frame 44 by a pivotally mounted support bracket 46 through pivot pin 48 so that the transducer 24 can be moved into and out of pressure engagement with overlapped strap end SU, SL. The pivotal movement of the platform is accomplished by the movement of a cam follower 50 that is secured to the pressure arm 43 that is pivotally secured to the support bracket 46.

The cam follower 50 is controlled by a cam track 54 located on a cam shaft 56 the operation of which will be described in the method of operation.

To provide for the desired pressure on the overlapped strap ends when the transducer tip is biased into contact therewith a pressure adjustment is provided between the platform 42 and the pressure arm 43. This consists of a rod 60 located in an opening 62 which is adjustably fixed therein by a threaded fastener 64 and a lock nut 66 to bias the pressure arm 43 against the spring 70 in the adjacent opening of the platform 42. With this pressure arm 43 secured in place, the pressure imposed by the transducer tip on the strap ends when the tip is moved thereagainst can be adjusted by varying the setting of the spring 70 located between the adjusting fastener 72 secured to the platform 42. It is to be noted that the upward movement of the platform is limited by the stop pin 74 engaging the main frame.

The cam track 54 which controls the movement of the cam follower 50 and thus the pivotal movement of the transducer 24 is part of a cam shaft 56 that is synchronized with the movement of the carrier chain. The main cam shaft is supported by bearings 76 to the main frame 44 and provision may be made by suitable mechanism to operate the shaft by the same motor which moves the carrier chain 20. Also provided on the cam shaft are cams 80, 82 that engage followers 84, 86 connected to pivoted lever mechanisms 90, 92 that control the movements of the anvil 22 and grippers 26 and 30 and cutter 32 assemblies. More specifically, after friction-fusion is completed, the cam roller 84 resiliently biased by springs 96 into contact with cam track 80 will upon rotation of the cam shaft 56 operate the anvil actuating arm 90 that is swingable about pivot 91 in the support housing 44. Movement of the arm 90 will shift the anvil 22 rearwardly so that the completed joint will snap up against the underside of the package as shown in FIG. 7. Furthermore, cam roller 86 resiliently biased by springs 94 into contact with cam track 82 will upon rotation of the cam shaft 56 operate a gripper and cutter actuating arm 92 that is swingable about a pivot 93 in the support housing 44. Movement of the arm 92 will actuate the gripper and cutter assembly in that manner illustrated in FIGS. 12-14. The gripper and cutter section is slidably mounted on the frame surface 100 and includes a pair of grippers 26 and 30 that are pivotally mounted to the frame by pin 102.

Figure 12:
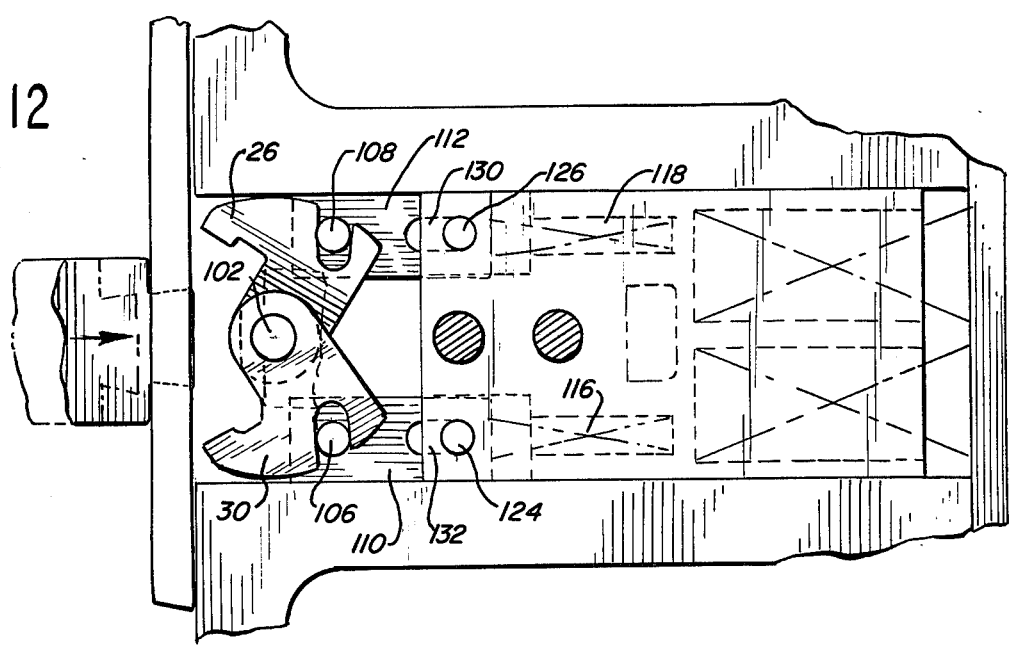
FIGS. 12-14 are plan views showing sequential movement of the grippers and cutter mechanisms.

The pivotal movement of the grippers is controlled by pins 106, 108 disposed in transversely spaced plates 110, 112 that are resiliently biased to the position shown in FIG. 12 by springs 116 & 118 located between the plates and the block 120. The plates are secured to the block by pins 124, 126 but the block is free to be moved relative to the plates 110, 112 by virtue of the pins being located in slots 130, 132. Secured to the top of the block is cutter blade 32. It can be seen as the block moves forward from the position shown in FIG. 12 to that shown in FIG. 13, the block and plates are moved together due to the stiffness of the springs 116, 118. Thus the forward movement of the block 120 will act to pivot the grippers 26, 30 against the sidewalls of the anvil 22. After the grippers are in contact with the anvil, or as shown in FIGS. 2-4, the right-hand gripper 26 presses the strap against the side of the anvil 22, further movement of the block 120 will move the block relative to the plates 110, 112 as the pins 124, 126 slide in the slots 130, 132. Additional forward movement brings the cutter 32 over the top surface of the anvil 22 and severs the strap adjacent to the joint. At this time, the left-hand gripper 30 has been moved into position and will retain the trailing strap against the anvil 22 so that the pre-draping cycle can begin again in the reverse direction.

With the above, all of the component parts of the novel apparatus forming the present invention has been described in appropriate detail. As aforementioned, only those mechanisms have been described that are important for the understanding of the present invention and where further details of some of the components are required, reference is again made to U.S. Pat. No. 3,548,740 and pending U.S. application Ser. No. 261,969.

To obtain a clear understanding of the present invention, the method of operation of the illustrated apparatus will now be described. Starting with the illustration in FIG. 2, the free strap end is pinched between the upper right-hand side of anvil 22 and the right-hand gripper 26, with the strap passing under the anvil 22 to the left to be draped in a clockwise direction around the package P. The left-hand gripper 30 has been shown removed for illustration purposes since it serves no function at this time. Suitable operation of the cam shaft 56, cam follower 86 and arm 92 have been accomplished to place the gripper 26 in the proper position.

Figure 5:
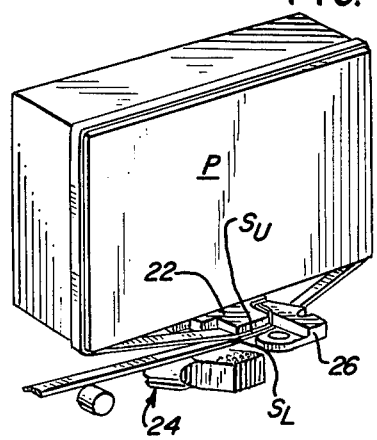
FIG. 5 is a view similar to FIG. 4 but showing the strap tensioned about the package prior to fusion.

When the strap is passed completely around the package with the lower overlapped end in contact with the upper strap adjacent the anvil 22 as shown in FIG. 5, the operation of the cam follower 50 due to the rotation of the cam track 54 by the cam shaft 56, transducer has been pivotally moved to where the transducer tip 36 is biased against the overlapped strap ends with a predetermined pressure to maintain the overlapped ends SU, SL in friction contact. At this time, the transducer is operated to move the tip and associated lower strap SL in a transverse direction relative to the upper strap SU at a very high frequency with a very low amplitude. The operation of the transducer is timed so that the vibration movement of the lower strap will cause a molten interface layer which will fuse to complete the joint. In this type of high-velocity action, the heat is mainly concentrated at the strap interface regions which melts the plastic material the strap is made of. The transducer tip remains in contact long enough to solidify the plastic material thereby effecting a securely fused joint. The operation is very quiet and an excellent joint is formed due to small motion at the joint interval. Such motion damages very little of the strap orientation. After the fusing cycle is completed, the chain 20 reverses rotation and the operation of the cam shaft 56 and the associated cams 54, 80, 82 are such as to move the transducer out of pivotal engagement with the fused joint and retract the anvil from above the joint to permit the strap to snap under the package. Further rotation of the shaft is such as to engage roller cam 84 to return the anvil 22 to the position shown in FIG. 8. After this occurs, the association between cam track roller 86 and arm 92 acts to move the gripper and cutter assembly forward to move the left-hand gripper against the action of the strap moving downwardly over the left-hand side of the anvil 22 to retain the trailing end of the strap in position against the anvil when the joint is severed from the trailing end of the strap. The sequence of operation of the arm is such as to move the block 120 further forward which carries with it the cutter blade 32 which slides between the bottom surface of lower strap SL and the top of the surface of the anvil 22 and severs the strap adjacent the formed joint.

The machine is now ready for another cycle but in the opposite, i.e., counterclockwise, wrapping direction. It is to be noted that while in the preferred embodiment a particular frequency and amplitude has been employed the invention is not so limited. This would be varied depending on the thickness and other properties of the strap.

It will be readily observed from the foregoing detailed description of the invention and in the illustrated embodiments thereof that numerous variations and modifications may be effected without departing from the true spirit and scope of the novel concepts and principles of this invention. For example, in the illustrated embodiment the ultrasonic friction-fusion device has been used with a fully automatic system wherein the apparatus employs a predraping arrangement. The utilization of such a novel friction-fusion device is not limited to such a system. It can, of course, be used with other types of automatic strapping equipment that does not employ a predraping system and in fact could be used if desired with a system which employs manual means for draping and tensioning strap about the package or any combination of manual and automatic means where the mechanism would be applicable.

What is claimed is:

1. Apparatus for securing a thermoplastic strap around a package or the like comprising: a support structure; means for placing a strap around a package and forming a tensioned loop having overlapped strap portions, an anvil reciprocably supported by said support structure, pivotally mounted ultrasonic means located on said support structure adjacent said overlapped strap portions, said support structure connected to said ultrasonic means solely at the nodal area of the ultrasonic means whereby it is supported in a vibration-free area relative to said support structure, said ultrasonic means including a tip portion having a side surface disposed adjacent said overlapped strap portions, means for effecting relative movement between said anvil and tip to compress the overlapping strap portions therebetween and means for operating said ultrasonic means to move said tip longitudinally and an adjacent overlapping strap portion at a very high frequency in a transverse direction relative to the adjacent overlapped strap portion to effect bodily sliding frictional movement between the overlapping strap portions to melt the interface regions therebetween.

2. Apparatus as set forth in claim 1 in which the nodal area of the transducer and the tip is rectangular in configuration whereby the transducer can be utilized in four different positions to extend the life thereof.

3. Apparatus as set forth in claim 2 in which the transducer support means includes a platform, means for pivotally mounting the platform, cam means for moving the platform relative to the overlapping strap portions whereby operation of said cam means will function to move the tip of the transducer into and out of engagement relative to the overlapping strap portions at the appropriate time.

4. Apparatus as set forth in claim 3 including spring means disposed between said cam means and said platform whereby the pressure acting on the overlapping strap portions when the tip is in engagement therewith can be varied as desired.

* * * * *